(12) United States Patent
Jeong et al.

(10) Patent No.: US 9,070,911 B2
(45) Date of Patent: Jun. 30, 2015

(54) TOP CAP ASSEMBLY HAVING TERMINAL BLOCK

(71) Applicant: LG CHEM, LTD., Seoul (KR)

(72) Inventors: Jic Han Jeong, Cheongwon-gun (KR); Jung Hwan Kim, Cheongju-si (KR); Ju Hwan Baek, Seoul (KR); Suk Jin Song, Cheongwon-gun (KR); Young Ho Son, Cheongju-si (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/344,383

(22) PCT Filed: Oct. 15, 2012

(86) PCT No.: PCT/KR2012/008358
§ 371 (c)(1),
(2) Date: Mar. 12, 2014

(87) PCT Pub. No.: WO2013/062256
PCT Pub. Date: May 2, 2013

(65) Prior Publication Data
US 2015/0004441 A1   Jan. 1, 2015

(30) Foreign Application Priority Data

Oct. 25, 2011  (KR) .................. 10-2011-0109086

(51) Int. Cl.
*H01M 2/04* (2006.01)
*H01M 2/30* (2006.01)
(Continued)

(52) U.S. Cl.
CPC .............. *H01M 2/0404* (2013.01); *H01M 2/30* (2013.01); *H01M 2/0473* (2013.01); *H01M 2/26* (2013.01); *H01M 10/425* (2013.01); *H01M 2200/106* (2013.01); *H01M 10/052* (2013.01)

(58) Field of Classification Search
None
See application file for complete search history.

(56) References Cited

U.S. PATENT DOCUMENTS 6,235,424 B1    5/2001   Cho
2004/0180260 A1  9/2004  Somatomo et al.
(Continued)

FOREIGN PATENT DOCUMENTS

EP    1 202 401 A2    5/2002
EP    2 224 517 A1    9/2010
(Continued)

OTHER PUBLICATIONS

International Search Report issued in PCT/KR2012/008358, mailed on Dec. 27, 2012.

*Primary Examiner* — Ula C Ruddock
*Assistant Examiner* — Tony Chuo
(74) *Attorney, Agent, or Firm* — Birch, Stewart, Kolasch & Birch, LLP

(57) ABSTRACT

Disclosed herein is a top cap assembly mounted to a battery cell having an electrode assembly of a cathode/separator/anode structure disposed in a battery case together with an electrolyte in a sealed state, the battery case being provided at an upper end thereof with a first electrode terminal and a second electrode terminal, the top cap assembly including a protection circuit module (PCM) and an electrically insulative top cap housing mounted to the upper end of the battery cell while surrounding an outside of the PCM, wherein the PCM includes a protection circuit board (PCB) having a protection circuit formed thereon, the PCB being coupled to a mechanical coupling part of a terminal block, connecting parts connected to the first electrode terminal and the second electrode terminal, a safety element, and the terminal block mounted to the PCM, the terminal block including connectors.

8 Claims, 3 Drawing Sheets

(51) Int. Cl.
*H01M 2/26* (2006.01)
*H01M 10/42* (2006.01)
*H01M 10/052* (2010.01)

(56) References Cited

U.S. PATENT DOCUMENTS

| | | |
|---|---|---|
| 2005/0214597 A1 | 9/2005 | Kim et al. |
| 2006/0093896 A1 | 5/2006 | Hong et al. |
| 2008/0171235 A1 | 7/2008 | Seo et al. |
| 2009/0136831 A1 | 5/2009 | Wyser |
| 2010/0178536 A1 | 7/2010 | Kwak et al. |
| 2010/0316892 A1 | 12/2010 | Kim |
| 2010/0323226 A1 | 12/2010 | Kim |
| 2011/0127966 A1 | 6/2011 | Lee |
| 2011/0183160 A1 | 7/2011 | Baek |
| 2012/0040209 A1 | 2/2012 | Baek et al. |

FOREIGN PATENT DOCUMENTS

| | | |
|---|---|---|
| JP | 2006-066289 A | 3/2006 |
| JP | 2009-521094 A | 5/2009 |
| JP | 2010-182628 A | 8/2010 |
| JP | 2010-182669 A | 8/2010 |
| KR | 10-2010-0082532 A | 7/2010 |
| KR | 10-2010-0097555 A | 9/2010 |
| KR | 10-2010-0135046 A | 12/2010 |
| KR | 10-2011-0021433 A | 3/2011 |
| KR | 10-2011-0060799 A | 6/2011 |
| TW | 535312 B | 6/2003 |
| TW | I299592 B | 8/2008 |

TOP CAP ASSEMBLY HAVING TERMINAL BLOCK

TECHNICAL FIELD

The present invention relates to a top cap assembly having a novel structure, and, more particularly, to a top cap assembly mounted to a battery cell having an electrode assembly disposed in a battery case together with an electrolyte in a sealed state, the battery case being provided at an upper end thereof with a first electrode terminal and a second electrode terminal, the top cap assembly including a protection circuit module (PCM) and an electrically insulative top cap housing mounted to the upper end of the battery cell while surrounding an outside of the PCM, wherein the PCM includes a protection circuit board (PCB) having a protection circuit formed thereon, the PCB being coupled to a mechanical coupling part of a terminal block, connecting parts connected to the first electrode terminal and the second electrode terminal, a safety element, and the terminal block mounted to the PCM, the terminal block including connectors.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent charge retention and service-life characteristics, which has been widely used as an energy source for various electronic products as well as mobile devices.

However, various kinds of combustible materials are contained in the lithium secondary battery. As a result, the lithium secondary battery may be heated or explode due to the overcharge of the battery, the overcurrent in the battery, or external physical impact. That is, the safety of the lithium secondary battery is very low. Consequently, safety elements, such as a positive temperature coefficient (PTC) element and a protection circuit module (PCM), to effectively control an abnormal state of the lithium secondary battery, such as the overcharge of the lithium secondary battery or the overcurrent in the lithium secondary battery, are mounted to a battery cell in a state in which the safety elements are connected to the battery cell.

Generally, a PCM is inserted into a top cap housing and is coupled to the top cap housing by welding or soldering. That is, the PCM is inserted into the top cap housing, in which a connecter is assembled, and is coupled to the top cap housing by welding or soldering so that the PCM is connected to a top cap assembly, and the top cap assembly is coupled to a battery cell. In this way, a battery pack is manufactured.

When a welding or soldering process is carried out, however, more precise work is required due to a compact structure of the secondary battery with the result that a defect rate may be increased. Also, a battery pack assembly process is complicated due to processes related to soldering, such as soldering, washing, and external appearance inspection of solder.

In addition, soldering tolerance is unavoidable, and therefore, it is necessary to increase the length of electric components constituting the battery pack with the result that the capacity of the battery cell is reduced.

Therefore, there is a high necessity for a technology that is capable of stably coupling members mounted to the upper end of a battery cell without soldering and, at the same time, of simplifying an assembly process, thereby minimizing manufacturing cost.

DISCLOSURE

Technical Problem

Therefore, the present invention has been made to solve the above problems, and other technical problems that have yet to be resolved.

Specifically, it is an object of the present invention to provide a top cap assembly having a terminal block of a novel structure formed at a protection circuit module (PCM).

It is another object of the present invention to provide a secondary battery pack that can be stably manufactured at minimal cost through a simplified assembly process of a top cap assembly.

Technical Solution

In accordance with one aspect of the present invention, the above and other objects can be accomplished by the provision of a top cap assembly mounted to a battery cell having an electrode assembly of a cathode/separator/anode structure disposed in a battery case together with an electrolyte in a sealed state, the battery case being provided at an upper end thereof with a first electrode terminal and a second electrode terminal, the top cap assembly including a protection circuit module (PCM) and an electrically insulative top cap housing mounted to the upper end of the battery cell while surrounding an outside of the PCM, wherein the PCM includes a protection circuit board (PCB) having a protection circuit formed thereon, the PCB being coupled to a mechanical coupling part of a terminal block, connecting parts connected to the first electrode terminal and the second electrode terminal, a safety element, and the terminal block mounted to the PCM, the terminal block including connectors.

In the top cap assembly according to the present invention, therefore, the terminal block may be coupled to the PCM through a simple assembly process. As a result, movement between components is minimized, and therefore, the top cap assembly has a very stable structure.

In a preferred example, the first electrode terminal may be a cathode terminal, and the second electrode terminal may be an anode terminal. For example, a prismatic battery cell is configured to have a structure in which an electrode terminal protruding from the upper end of the prismatic battery cell and a battery case form an anode terminal and a cathode terminal, respectively, and an insulation member, such as a gasket, is disposed between the anode terminal and the cathode terminal. In the structure of such a prismatic battery cell, therefore, the first electrode terminal may be a cathode terminal, which is the upper end of the battery case, and the second electrode terminal may be an anode terminal protruding from the upper end of the battery case.

The connecting parts may be formed at the bottom of the PCB. For example, the connecting parts may be formed at positions corresponding to the first electrode terminal and the second electrode terminal.

In another preferred example, the mechanical coupling part may include a fastening protrusion protruding downward from a lower end of the terminal block, and the PCB may be provided with a fastening groove formed at a position corresponding to the fastening protrusion.

Consequently, the terminal block may be easily mounted to the PCB through coupling between the fastening protrusion and the fastening groove, thereby simplifying an assembly process and improving mechanical stability.

In the above structure, the terminal block may have at least one hook protruding downward therefrom to fixedly fasten the PCB while surrounding the outside of the PCB in a state in which the fastening protrusion is inserted in the fastening groove in order to secure a more stable coupling state.

The protruding height of the fastening protrusion may be equal to the thickness of the PCB. If the protruding height of the fastening protrusion is too low, the fastening protrusion may not function with the result that coupling force between the fastening protrusion and the fastening groove may be decreased. On the other hand, if the protruding height of the fastening protrusion is too high, the volume of the top cap assembly is increased, which is not preferable. In consideration of the above matters, therefore, the protruding height of the fastening protrusion is properly set. It is preferable for the protruding height of the fastening protrusion to be equal to the thickness of the PCB as described above.

In a concrete example, the terminal block may be provided at one major surface thereof with a guide lip for mechanical fastening with the top cap housing and hooks disposed at opposite sides of the guide lip.

Also, the top cap housing may be provided with a terminal lip, which is provided between tapered parts, and a pair of slit opening corresponding to the guide lip and the hooks, respectively. In particular, the protruding terminal lip is formed between the tapered parts. When the top cap housing is mounted to the PCM, therefore, the hooks and the guide lip may be respectively fastened to the terminal lip and the slit openings by force fitting.

Since coupling between the top cap housing and the terminal block is achieved by force fitting through such a mutual coupling fashion, it is possible to secure a stable coupling state of the top cap assembly.

In the above structure, the hooks and the guide lip are respectively fastened to the terminal lip and the slit openings when the top cap housing is mounted to the PCM. During mutual coupling, therefore, the movement between the top cap housing, the terminal block, and the PCM is minimized, thereby improving assembly accuracy. Also, a soldering process is omitted, and therefore, the total length of the battery cell is increased, thereby maximizing the capacity of the battery cell.

Meanwhile, coupling between the safety element of the terminal block and the connectors may be achieved in various manners. For example, the connectors of the terminal block may be mounted to the PCB using surface mounting technology (SMT).

Using such SMT, it is possible to prevent paste from remaining at the bottom of the PCM during soldering or to prevent the bottom of the PCM from being damaged due to heat during welding. Also, it is possible to achieve accurate and reliable coupling as compared with using conventional welding or soldering. For reference, SMT is widely used to mount surface mount type parts to an electronic board, such as a printed circuit board (PCB).

In an example, the safety element may be an element, the resistance of which is increased as the temperature of the element is increased. Preferably, the safety element is a positive temperature coefficient (PTC) element. When the temperature of a battery pack is abruptly increased due to internal short circuit, a connection member coupled to the PTC element serves to interrupt current from the upper end of the battery pack. Of course, the safety element is not limited to the PTC element. For example, a bimetal or fuse may be used as the safety element.

In another example, the top cap housing may be provided with an opening having a size corresponding to the terminal block mounted to the PCB. Consequently, the terminal block can be easily mounted to the top cap housing.

In accordance with another aspect of the present invention, there is provided a secondary battery pack configured so that the top cap assembly with the above-stated construction according to the present invention is mounted to the upper end of a battery cell having an electrode assembly of a cathode/separator/anode structure disposed in a battery case together with an electrolyte in a sealed state.

The secondary battery pack may be applied in various manners irrespective of the kind and external appearance of the battery cell. For example, a battery pack including a prismatic lithium secondary battery as the battery cell may be applied.

In accordance with a further aspect of the present invention, there is provided a method of manufacturing a top cap assembly including (a) coupling a terminal block to the top of a PCB using a mechanical fastening method to manufacture a PCM, and (b) mounting an insulative top cap housing to the PCM.

In a preferred example, a fastening protrusion is coupled to a fastening groove at step (a), and a guide lip and hooks formed at the inside of the top cap housing are respectively fastened to tapered parts and slit openings formed at the rear of the terminal block at step (b).

Consequently, it is possible to improve assembly efficiency as compared with a conventional process of manufacturing a top cap assembly, and therefore, it is possible to manufacture a battery pack with improved mechanical strength and stability.

Of course, some processes of the above manufacturing method may be omitted or other processes may be additionally included in the manufacturing method by those skilled in the art.

Advantageous Effects

As is apparent from the above description, the top cap assembly according to the present invention can be manufactured to have improved stability using a simplified assembly method including a process of mounting a terminal block of a specific structure to a PCB and a process of mechanically coupling a PCM to a top cap housing.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
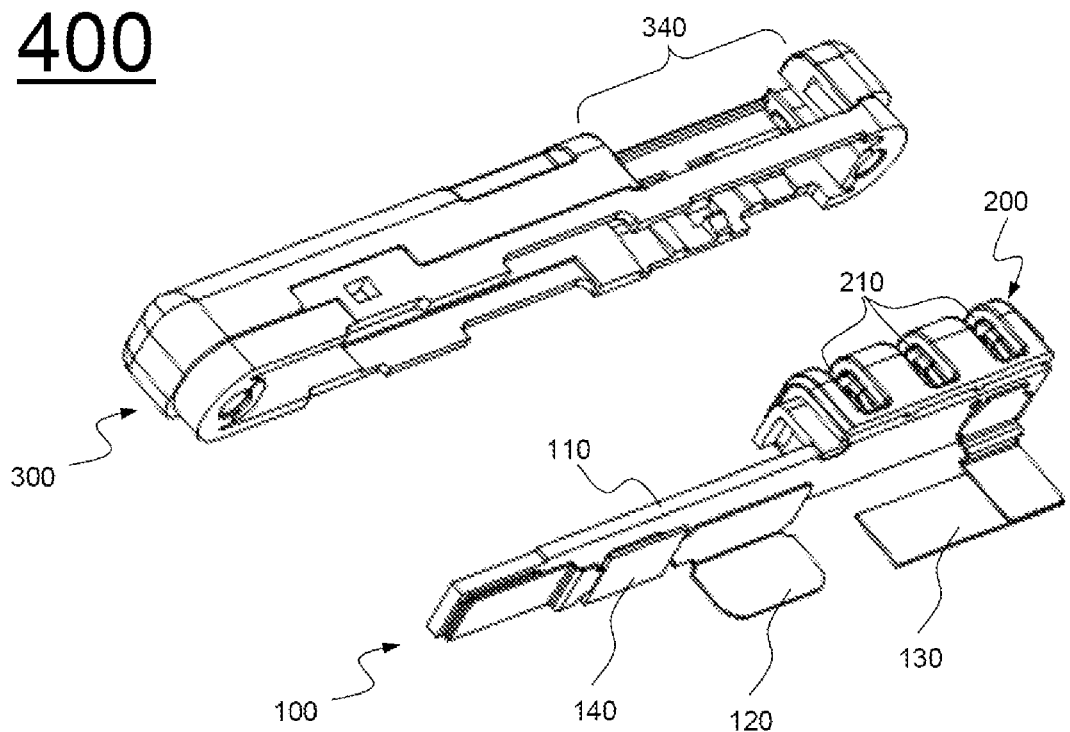
FIG. 1 is an exploded perspective view showing a top cap assembly according to an embodiment of the present invention.

FIG. 1 is an exploded perspective view showing a top cap assembly 400 according to an embodiment of the present invention.

Referring to FIG. 1, the top cap assembly 400 includes a protection circuit module (PCM) 100 and an electrically insulative top cap housing 300 mounted to the upper end of a battery cell (not shown) while surrounding the outside of the PCM 100.

The PCM 100 includes a protection circuit board (PCB) 110 having a protection circuit formed thereon, the PCB 110 being coupled to a mechanical coupling part (not shown) of a terminal block 200, connecting parts 120 and 130 formed at the bottom of the PCB 110, and the terminal block 200 including a positive temperature coefficient (PTC) element 140 and connectors 210 mounted at the top of the PCB 110.

The connectors 210 of the terminal block 200 are mounted at the top of the PCB 110 using surface mounting technology (SMT).

Figure 2:
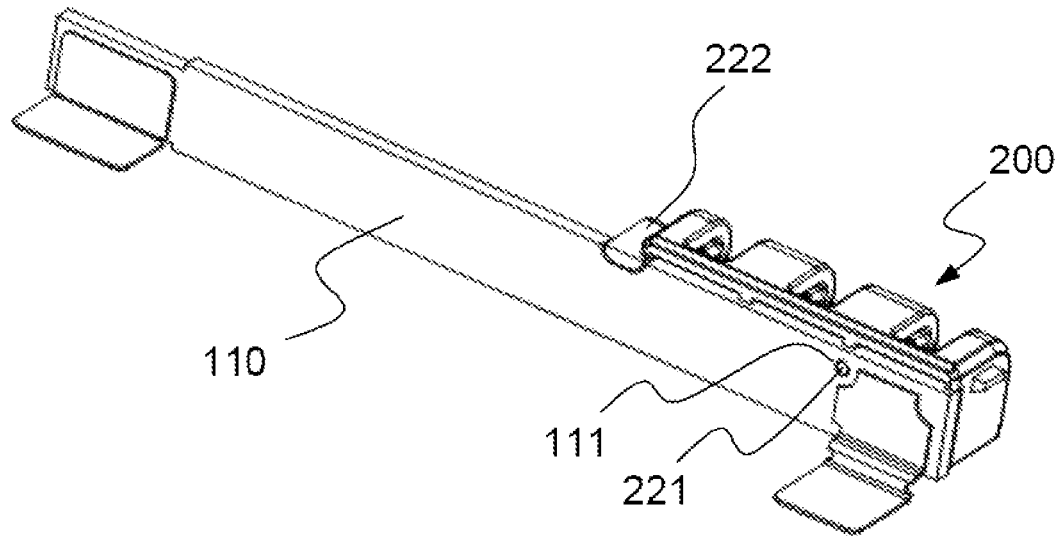
FIG. 2 is a perspective view showing a protection circuit module (PCM) of FIG. 1.

FIG. 2 is a perspective view typically showing the PCM of FIG. 1.

Referring to FIG. 2 together with FIG. 1, the mechanical coupling part (not shown) includes a fastening protrusion 221 protruding downward from the lower end of the terminal block 200. The PCB 110 is provided with a fastening groove 111 formed at a position corresponding to the fastening protrusion 221.

The protruding height of the fastening protrusion 221 is almost equal to the thickness of the PCB 110.

Also, a hook 222 protrudes downward from the terminal block 200. The hook 222 fixedly fastens the PCB 110 while surrounding the outside of the PCB 110 in a state in which the fastening protrusion 221 is inserted in the fastening groove.

Figure 3:
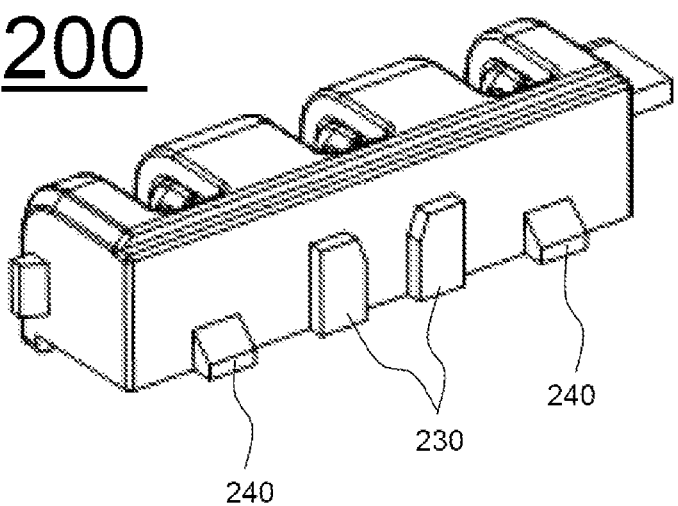
FIG. 3 is a perspective view showing a terminal block of FIG. 1.
Figure 4:
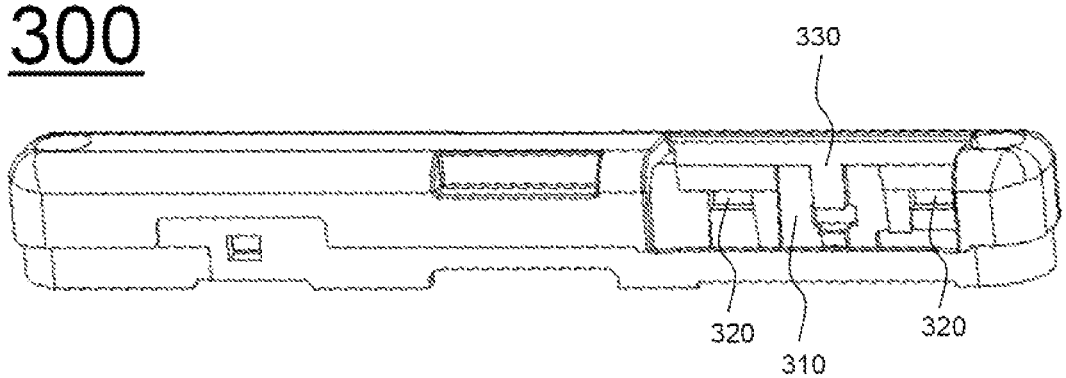
FIG. 4 is a front perspective view showing a top cap housing of FIG. 1.

FIG. 3 is a perspective view showing the terminal block of FIG. 1, and FIG. 4 is a front perspective view showing the top cap housing of FIG. 1.

Referring to these drawings together with FIGS. 1 and 2, the terminal block 200 is provided at one major surface thereof with a guide lip 230 for mechanical fastening with the top cap housing 200 and hooks 240 disposed at opposite sides of the guide lip 230.

The top cap housing 300 is provided with a terminal lip 330 and a pair of slit opening 320 corresponding to the guide lip 230 and the hooks 240, respectively. The terminal lip 330 is disposed between tapered parts 310. When the top cap housing 300 is mounted to the PCM 100, therefore, the hooks 240 and the guide lip 230 are respectively fastened to the terminal lip 330 and the slit openings 320 by force fitting.

Also, the top cap housing 300 is provided with an opening 340 having a size corresponding to the terminal block 200 mounted at the top of the PCB 110 so that the terminal block 200 can be mounted to the top cap housing 300.

Although not shown in the drawings, the PCM as shown in FIG. 2 is mounted to a prismatic battery cell (not shown) in a state in which the PCM is electrically connected to the prismatic battery cell, and the top cap housing as shown in FIG. 4 is mounted to the PCM. As a result, a battery pack is manufactured. Electrical connection between the prismatic battery cell and the PCM is well known in the art to which the present invention pertains, and therefore, a detailed description thereof will be omitted.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A top cap assembly mounted to a battery cell having an electrode assembly of a cathode/separator/anode structure disposed in a battery case together with an electrolyte in a sealed state, the battery case being provided at an upper end thereof with a first electrode terminal and a second electrode terminal, the top cap assembly comprising a protection circuit module (PCM) and an electrically insulative top cap housing mounted to the upper end of the battery cell while surrounding an outside of the PCM, wherein the PCM comprises:
   a protection circuit board (PCB) having a protection circuit formed thereon, the PCB being coupled to a mechanical coupling part of a terminal block;
   connecting parts connected to the first electrode terminal and the second electrode terminal;
   a safety element; and
   the terminal block mounted to the PCM, the terminal block comprising connectors,
   wherein the mechanical coupling part comprises a fastening protrusion protruding downward from a lower end of the terminal block, and the PCB is provided with a fastening groove formed at a position corresponding to the fastening protrusion;
   the terminal block has at least one hook protruding downward therefrom to fixedly fasten the PCB while surrounding an outside of the PCB in a state in which the fastening protrusion is inserted in the fastening groove;
   a protruding height of the fastening protrusion is equal to a thickness of the PCB;
   the terminal block is provided at one major surface thereof with a guide rib for mechanical fastening with the top cap housing and hooks disposed at opposite sides of the guide rib;
   the top cap housing is provided with a terminal rib, which is provided between tapered parts, and a pair of slit openings corresponding to the guide rib and the hooks, respectively; and
   the hooks and the guide rib are fastened to the terminal rib and the slit openings, respectively, when the top cap housing is mounted to the PCM.

2. The top cap assembly according to claim 1, wherein the first electrode terminal is a cathode terminal, and the second electrode terminal is an anode terminal.

3. The top cap assembly according to claim 1, wherein the connecting parts are formed at a bottom of the PCB.

4. The top cap assembly according to claim 1, wherein the connectors of the terminal block are mounted to the PCB using surface mounting technology (SMT).

5. The top cap assembly according to claim 1, wherein the safety element is a positive temperature coefficient (PTC) element.

6. The top cap assembly according to claim 1, wherein the top cap housing is provided with an opening having a size corresponding to the terminal block mounted to the PCB.

7. A secondary battery pack configured so that the top cap assembly according to claim 1 is mounted to an upper end of a battery cell having an electrode assembly of a cathode/separator/anode structure disposed in a battery case together with an electrolyte in a sealed state.

8. The secondary battery pack according to claim 7, wherein the battery cell is a prismatic lithium secondary battery cell.

* * * * *